(12) United States Patent
Stiesdal

(10) Patent No.: US 8,882,466 B2
(45) Date of Patent: Nov. 11, 2014

(54) ROTOR BLADE ASSEMBLY

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 650 days.

(21) Appl. No.: 13/151,670

(22) Filed: Jun. 2, 2011

(65) Prior Publication Data

US 2011/0305574 A1    Dec. 15, 2011

(30) Foreign Application Priority Data

Jun. 11, 2010 (EP) .................................... 10165721

(51) Int. Cl.
*F03D 11/00*  (2006.01)
*F03D 1/06*   (2006.01)

(52) U.S. Cl.
CPC ............. *F03D 1/065* (2013.01); *F05B 2260/30* (2013.01); *F05B 2240/30* (2013.01); *F05B 2240/221* (2013.01); *F03D 11/0033* (2013.01); *F05C 2201/0448* (2013.01); *Y02E 10/722* (2013.01); *F05C 2203/02* (2013.01); *F05B 2280/2001* (2013.01); *Y02E 10/721* (2013.01); *F05B 2250/712* (2013.01); *F05B 2280/1071* (2013.01); *F05B 2250/70* (2013.01); *F05B 2250/711* (2013.01)
USPC .................... 416/146 R; 416/224; 416/229 R

(58) Field of Classification Search
CPC ................. F03D 1/065; F03D 11/0033; F05B 2240/221; F05B 2240/30; F05B 2260/30; Y02E 10/721; Y02E 10/722
USPC ............. 416/62, 146 R, 228, 229 R, 230, 224
See application file for complete search history.

(56) References Cited

U.S. PATENT DOCUMENTS

| | | | |
|---|---|---|---|
| 2008/0193292 A1* | 8/2008 | Stam et al. | 416/146 R |
| 2009/0139739 A1* | 6/2009 | Hansen | 174/2 |
| 2010/0329881 A1* | 12/2010 | Mendez Hernandez et al. | 416/230 |
| 2011/0110789 A1* | 5/2011 | Luebbe | 416/241 R |

FOREIGN PATENT DOCUMENTS

| | | |
|---|---|---|
| CN | 101655071 A | 2/2010 |
| DE | 10 2005 051 537 A1 | 5/2007 |
| WO | WO 96/07825 A1 | 3/1996 |
| WO | WO 2007/128314 A1 | 11/2007 |

* cited by examiner

*Primary Examiner* — Dwayne J White

(57) ABSTRACT

A rotor blade assembly is provided that includes a rotor blade and a rotor blade tip member. The rotor blade is provided with an integrated lightning down conductor and is attachable or attached to a rotor hub of a wind turbine. The rotor blade tip member is made of an electrically insulating material and is detachably attached or adapted to be detachably attached to a free ending of the rotor blade by a connecting device. The connecting device is a wire or a rod made of an electrically conductive material establishing or adapted to establish a mechanical and electrical connection of the rotor blade tip member with the lightning down conductor of the rotor blade.

14 Claims, 2 Drawing Sheets

ROTOR BLADE ASSEMBLY

CROSS REFERENCE TO RELATED APPLICATIONS

This application claims priority of European Patent Office application No. 10165721.1 EP filed Jun. 11, 2010, which is incorporated by reference herein in its entirety.

FIELD OF INVENTION

The invention relates to a rotor blade assembly comprising a rotor blade with an integrated lightning down conductor, the rotor blade being attachable or attached to a rotor hub of a wind turbine, whereby a rotor blade tip member made of an electrically insulating material is adapted to be detachably attached or detachably attached to the free ending of the rotor blade by means of a connecting means.

BACKGROUND OF INVENTION

Nowadays, various types of wind turbines comprise a separate rotor blade tip member disposed at the free endings of the respective rotor blades. Therefore, diverse connecting means providing a firm connection of the rotor blade tip member to the basic structure of the rotor blade are known. Thereby, usually adhesive means, bolts or rods adhered to the rotor blade tip member and the basic structure of the rotor blade are in use.

The rotor blade tip member may be of a different material as the rotor blade itself and may serve as a general rotor blade tip protection and if it comprises an electric conductive material further as a lightning receptor, in particular when being connected to a lightning down conductor disposed within the rotor blade. Moreover, diverse aerodynamic designs of rotor blade tip members are known so as to change or influence the aerodynamic properties of the rotor blade tip.

SUMMARY OF INVENTION

Thereby, a known problem occurs from the connecting means connecting the extending member to the basic structure of the rotor blade since their ability to keep the extending member in firm and secure contact to the basic structure of the rotor blade decreases with time. This may lead to a loss of the extending member in the worst case, which is a significant safety problem in particular during operation of the wind turbine.

Hence, it is an object of the invention to provide a rotor blade assembly with a simple and secure connection of a rotor blade tip member and a rotor blade.

This is achieved by a rotor blade assembly as described above, wherein the connecting means is a wire or a rod made of an electrically conductive material adapted to establish or establishing a mechanical and electrical connection of the rotor blade tip member with the lightning down conductor of the rotor blade.

The present invention provides a simple and stable mechanical connection or connectability of the blade tip member with the rotor blade by means of the connecting means having the shape of a wire or a rod. Additionally, an electrical connection between the blade tip member and the rotor blade is established or establishable as well due to the inventive connecting means being made of an electrically conductive material. Since the connecting means having the shape of a strong wire or a rod preferably made of a metal material like steel for instance represents the only mechanically tight connection between the blade tip member and the rotor blade, no additional connecting means is necessary. Thereby, the connecting means is adapted to establish or establishes both a mechanical and electrical junction of the blade tip member and the rotor blade since the connecting means is being connected to the lightning down conductor integrated in the rotor blade. In other words, the invention allows both a mechanical and an electrical connection of the blade tip member with the rotor blade using merely a single connecting means. Generally, the blade tip member may imply a retrofitting part for a given rotor blade.

It is preferred, that the rotor blade tip member has a cap-like shape and is provided with a connecting portion adapted to at least partially overlap or at least partially overlapping the free ending of the rotor blade, thereby abutting the rotor blade in a form closure so as to build a closed surface of the rotor blade assembly. Thus, the invention does not provide a simple face-to-face joint of the blade tip member with the free ending of the rotor blade, but an at least partial overlap of the free ending of the rotor blade by the connecting portion of the blade tip member in terms of an additional cap disposed at the free endings of the rotor blade. Likewise, the connecting portion of the blade tip member abuts the rotor blade in a form closure, thereby assuring a closed surface of the rotor blade assembly, that is the blade tip member and the rotor blade show good properties in regard of aerodynamics and fluid mechanics in their connected state. Thus, the geometric structure of the blade tip member is adapted to provide a firm mechanical as well as a proper aerodynamic connection with the given structure of the rotor blade. If need be, one or more sealing elements may be provided with the abutting surfaces between the rotor blade tip member and the rotor blade.

Thereby, it is of advantage, when the free ending of the rotor blade is of reduced cross-section and the connecting portion of the rotor blade tip member is adapted to engage or engages with the portion of reduced cross-section so as to build a closed surface of the rotor blade assembly. In such a manner, the free ending has a special shape prepared for the connection by means of a form closure with the blade tip member which may be compared with a tongue and a groove of known plug-connections. Thereby, the free ending of the rotor blade having a reduced cross-section may be provided with a slight oversize in regard to the connection portion of the blade tip member so that the cap-like blade tip member is connected to the rotor blade by a force fit further increasing the mechanical stability of the junction between the blade tip member and the rotor blade. Again, a closed surface is built when blade tip member and rotor blade have been connected so as to provide good aerodynamic behaviour of the rotor blade assembly.

It is advisable, when a locking means is provided with the rotor blade tip member securing the connecting means to the rotor blade tip member. The locking means may be an anchor or the like providing a fine attachment of the connecting means within the blade tip member. If need be, at least one closable opening is provided with the blade tip member so as to assure an appropriate axis to the locking means in terms of east installation, maintenance and/or repair. An additional or alternative locking means may be provided with the rotor blade. The same applies to the closable opening.

In a further embodiment of the invention, the rotor blade tip member comprises at least one lightning receptor electrically connected with the connecting means. In such a manner, the blade tip member may be understood as an elongated portion of the lightning down conductor being installed in the rotor blade. The given lightning down conductor may cooperate with the at least one additional lightning receptor disposed within the blade tip member by means of the connection via the electrically conductive connecting means. Thereby, the electrically conductive connecting means, that is the wire or the rod has appropriate electrical and mechanical stability so that one or more lightning strokes do not cause any damage.

In a preferred embodiment of the invention the locking means represents a lightning receptor itself and thus combines two functionalities that is firstly securing of the connecting means and secondly representing an additional part of the lightning conductor of the rotor blade assembly.

It is further possible to integrate additional functionalities like lamps, sensors for measuring wind speed or diverse other parameters being relevant for or during the operation of a wind turbine and/or strain gauges, etc within the blade tip member.

It may be that the rotor blade comprises a channel extending from the lightning conductor to its free ending for accommodating the connecting means. Hence, prepared passage is provided for a better and eased insertion or connection of the connecting means with the lightning conductor of the rotor blade. The channel may be a bore having dimensions adapted to the dimensions of the connecting means, that is the wire or the rod.

The rotor blade tip member may be shaped as a winglet. Winglets are intended to improve the efficiency of the rotor blade in such a manner, that the aerodynamic properties of the blade tip member and when connected to the rotor blade, of the entire rotor blade assembly may be further improved or adjusted.

Aside, the invention relates to a rotor blade tip member for a rotor blade assembly as described above, made of an electrically insulating material, adapted to be detachably attached to the free ending of a rotor blade with an integrated lightning down conductor by means of a connecting means, wherein the connecting means is a wire or a rod made of an electrically conductive material adapted to establish a mechanical and electrical connection of the rotor blade tip member with the lightning down conductor of the rotor blade. The rotor blade tip member may be understood as a retrofitting part for a given rotor blade. Thereby, a mechanical and electrical connection of the rotor blade tip member with a rotor blade is easily establishable by means of the connecting means that is the wire or the rod providing both mechanical stability and further electrical conductivity of the junction between the rotor blade tip member and the rotor blade. In other words, the rotor blade tip member may be detachably attached to a rotor blade using only one single connecting means that is one wire or one rod respectively.

The rotor blade tip member may comprise a cap-like shape and may be provided with at least one connecting portion adapted to at least partially overlap the free ending of a rotor blade, thereby fitting the rotor blade with a form closure so as to build a closed surface of the rotor blade. Thus, the inventive rotor blade tip member is adapted to be geometrically fitted to the free ending of a given rotor blade by means of a form closure which provides both a contribution to the mechanical junction between the rotor blade tip member and a rotor blade and by means of the closed surface being built after connecting the rotor blade tip member with a rotor blade good aerodynamic properties.

It is preferred, that the rotor blade tip member comprises a locking means securing the connecting means to the rotor blade tip member. Hence, a firm arrangement of the connecting means is provided within the rotor blade tip member by means of the locking means. It may be, that at least one opening or at least one lid is provided with the rotor blade tip member so as to allow an access to the locking means, which is useful especially in times of service, maintenance and/or repair of the rotor blade tip member as it assures its detachability.

In a further embodiment the rotor blade tip member comprises at least one lightning receptor electrically connected with the connecting means. Hence, the rotor blade tip member represents an elongated part of a given lightning conductor being installed in a rotor blade for instance. Thereby, it is preferred that the locking means is a lightning receptor, hence, the locking means has both mechanical as well as lightning conducting functions.

The rotor blade tip member may have the shape of a winglet. Thus, in dependence of the shape of the winglet, the aerodynamic properties of the blade tip member may be improved or adjusted.

Moreover, the invention relates to a wind turbine having a number of rotor blade assemblies as described above attached to a rotor hub.

BRIEF DESCRIPTION OF THE DRAWINGS

In the following the invention is described in detail as reference is made to the figures, whereby.

DETAILED DESCRIPTION OF INVENTION

Figure 1:
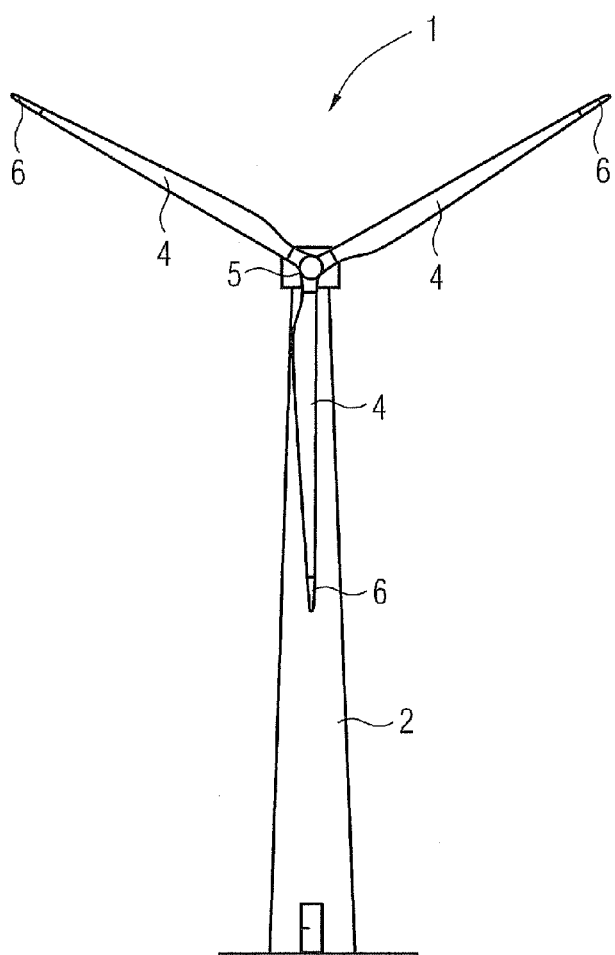
FIG. 1 shows a principle view of a wind turbine according to an embodiment of the invention.

FIG. 1 shows a wind turbine 1 comprising a tower 2 having a nacelle 3 disposed thereon. Three rotor blades 4 are attached to a rotor hub 5 adjacently disposed to the nacelle 3. Rotor blade tip members 6 extend from the free endings of the respective rotor blades 4. During operation of the wind turbine 1 wind will induce lift on the rotor blades 4 giving rise to a rotation of the rotor blades 4 in a direction perpendicular to the wind, whereby the rotation movement is converted to electric power by a generator disposed in the nacelle 3. The generated electrical power is supplied to the grid.

Figure 2:
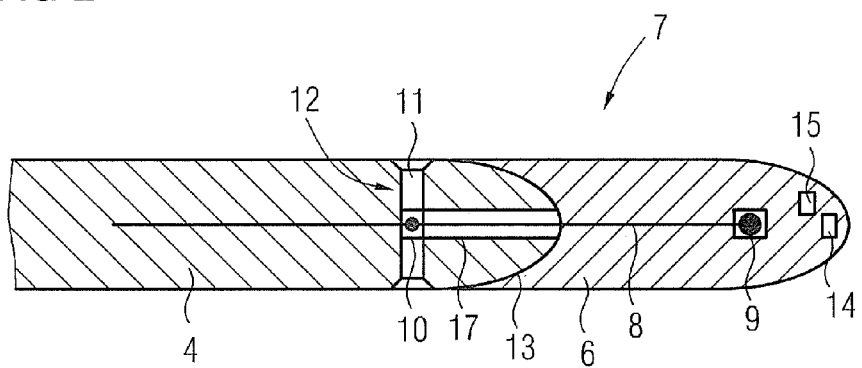
FIG. 2 shows a principle cut view of a rotor blade assembly according to a first embodiment of the invention.

FIG. 2 shows a principle cut view of a rotor blade assembly 7 according to a first embodiment of the invention, essentially comprising the rotor blade 4 and the cap-like shaped blade tip member 6. A mechanical and electrical connection of the blade tip member 6 with the rotor blade 4 is merely established by means of the metal rod 8 being locked to an anchor 9 at the side of the blade tip member 6 and to an anchor 10 disposed at a lightning receptor 11, which is a part of a lightning conductor 12 at the side of the rotor blade 4. Hence, the rod 8 represents the only connecting means providing a firm connection of the blade tip member 6 and the rotor blade 4.

Hence, the inventive connecting principle does not rely on adhesives applied on the rotor blade structure which may degrade in strength due to aging, environmental influences and/or local heating of the blade tip member as a consequence of a lightning stroke hitting the wind turbine.

Generally, the connection of the blade tip member 6 and the rotor blade 4 is detachable, since the rod 8 or the anchors 9, 10 respectively may be accessible through appropriate openings (not shown) in order to detach the rod 8 from the anchor 9 for instance as well as to further detach the blade tip member 6 from the rotor blade 4. The openings are closable during the operation of the wind turbine 1 by lids (not shown) or the like. Both rotor blade 4 and blade tip member 6 are made of an electrical insulating material like glass fibre for instance. As mentioned before, the rod 8 is made of an electrically conductive metal such as steel for instance.

As illustrated in FIG. 2, the blade tip member 6 comprises a connecting portion 13 overlapping the free ending of the rotor blade 4. Therefore, the connecting portion essentially has the same shape as the free ending of the rotor blade 4. In other words, the shape of the connecting portion 13 is adapted to the shape of the free ending of the rotor blade 4, so as to abut the free ending of the rotor blade 4 in a faun closure. As can be seen, a closed aerodynamic surface of the rotor blade assembly 7 is given, when rotor blade 4 and blade tip member 6 are connected.

Further elements such as lamps 14 or sensors 15 for the measurement of wind speed, temperature or the like or string gauges (not shown) may be integrated in the blade tip member 6.

The rotor blade 4 further comprises a channel 17 extending from the anchor 10, or the lightning conductor 12 to the free ending of the rotor blade 4, which channel accommodates the rod 8.

Figure 3:
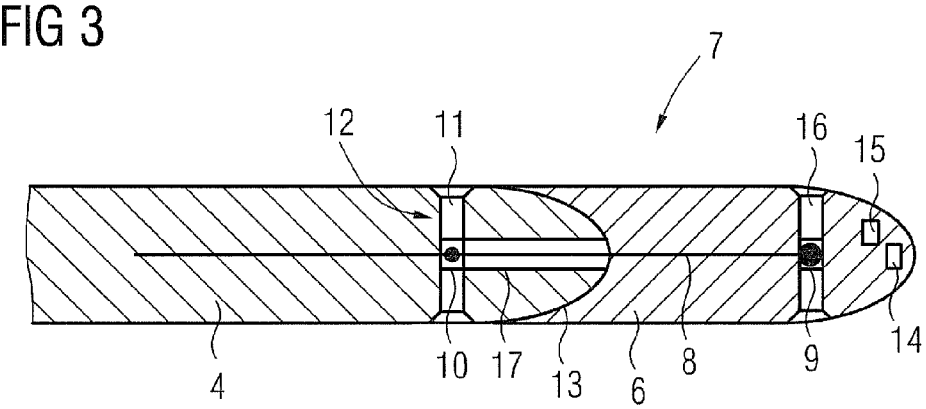
FIG. 3 shows a principle cut view of a rotor blade assembly according to a second embodiment of the invention.

FIG. 3 shows a principle cut view of a rotor blade assembly 7 according to a second embodiment of the invention, whereby same parts are denoted with same reference numbers. The essential difference to the embodiment according to FIG. 1 is that the anchor 9 holding the rod is integrated into a further lightning receptor 16 disposed within the blade tip member 6. Hence, the lightning conductor 12 of the rotor blade 4 is elongated by means of the electrically conductive rod 8 and the further lightning receptor 16 integrally comprising the anchor 9, so as to build an electrical connection from the lightning receptor 16 along the anchor 9, the rod 8, to the lightning conductor 12 disposed within the rotor blade 4.

Figure 4:
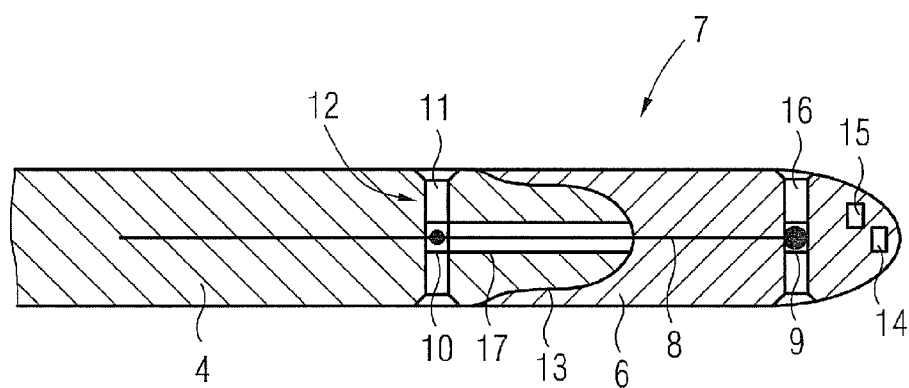
FIG. 4 shows a principle cut view of a rotor blade assembly according to a third embodiment of the invention.

As discernible from FIG. 4 showing a principle cut view of a rotor blade assembly 7 according to a third embodiment of the invention the free ending of the rotor blade 6 has is of reduced cross-section, whereby the connecting portion 13 of the cap-like shaped blade tip member 6 overlaps the portion of reduced cross-section, that is the portion of reduced cross-section engages with the connecting portion 13 of the blade tip member 6 in teens of a plug-connection. Again, a desired outer profile of the rotor blade 4 is formed by means of the form closure between the blade tip member 6 and the rotor blade 4.

The invention claimed is:

1. A rotor blade assembly comprising:
   a rotor blade with an integrated lightning down conductor, the rotor blade being attachable or attached to a rotor hub of a wind turbine, the rotor blade comprising a free ending;
   a rotor blade tip member made of an electrically insulating material; and
   a connecting device for detachably attaching the rotor blade tip member to the free ending of the rotor blade,
   wherein the connecting device is a wire or a rod made of an electrically conductive material for establishing a mechanical and electrical connection of the rotor blade tip member with the lightning down conductor of the rotor blade, and
   wherein the rotor blade tip member has a cap-like shape and is provided with a connecting portion adapted to at least partially overlap the free ending of the rotor blade to abut the rotor blade in a form closure so as to build a closed surface of the rotor blade assembly.

2. The rotor blade assembly according to claim 1, wherein the free ending of the rotor blade includes a portion having reduced cross-section and the connecting portion of the rotor blade tip member is adapted to engage with the portion of reduced cross-section so as to build the closed surface of the rotor blade assembly.

3. The rotor blade assembly according to claim 1, wherein a locking device is provided with the rotor blade tip member for securing the connecting device to the rotor blade tip member.

4. The rotor blade assembly according to claim 1, wherein the rotor blade tip member comprises at least one lightning receptor electrically connected with the connecting device.

5. The rotor blade assembly according to claim 3, wherein the locking device is a lightning receptor.

6. The rotor blade assembly according to claim 4, wherein the locking device is the at least one lightning receptor.

7. The rotor blade assembly according to claim 1, wherein the rotor blade further comprises a channel extending from the lightning down conductor to the free ending for accommodating the connecting device.

8. A rotor blade tip member for a rotor blade assembly,
   wherein the rotor blade tip member is made of an electrically insulating material,
   wherein the rotor blade tip member is adapted to be detachably attached to a free ending of a rotor blade of the rotor blade assembly with an integrated lightning down conductor by a connecting device, and
   wherein the connecting device is a wire or a rod made of an electrically conductive material adapted to establish a mechanical and electrical connection of the rotor blade tip member with a lightning down conductor of the rotor blade; having a cap-like shape and being provided with at least one connecting portion, the connecting portion being adapted to at least partially overlap the free ending of a rotor blade, to fit the rotor blade with a form closure so as to build a closed surface of the rotor blade.

9. The rotor blade tip member according to claim 8, further comprising a locking device for securing the connecting device thereto.

10. The rotor blade tip member according to claim 8, further comprising at least one lightning receptor electrically connected with the connecting device.

11. The rotor blade tip member according to claim 9, wherein the locking means is a lightning receptor.

12. The rotor blade tip member according to claim 10, wherein the locking means is the at least one lightning receptor.

13. The rotor blade tip member according to claim 8, wherein the rotor blade tip member has a shape of a winglet.

14. A wind turbine, comprising:
   a rotor hub; and
   a plurality of rotor blade assemblies attached to the rotor hub, each of the plurality of rotor blade assemblies comprising:
      a rotor blade with an integrated lightning down conductor, the rotor blade being attachable or attached to a rotor hub of a wind turbine, the rotor blade comprising a free ending;
      a rotor blade tip member made of an electrically insulating material; and
      a connecting device for detachably attaching the rotor blade tip member to the free ending of the rotor blade,
   wherein the connecting device is a wire or a rod made of an electrically conductive material for establishing a mechanical and electrical connection of the rotor blade tip member with the lightning down conductor of the rotor blade, and wherein the rotor blade tip member has a cap-like shape and is provided with a connecting portion adapted to at least partially overlap the free ending of the rotor blade to abut the rotor blade in a form closure so as to build a closed surface of the rotor blade assembly.

* * * * *